E. J. TOMLINSON.
GOVERNOR FOR ELECTRICAL CIRCUITS.
APPLICATION FILED APR. 7, 1919.

1,415,495.

Patented May 9, 1922.

INVENTOR
EDWARD J. TOMLINSON
BY
Albion D. T. Libby
ATTORNEY

UNITED STATES PATENT OFFICE.

EDWARD J. TOMLINSON, OF EAST ORANGE, NEW JERSEY, ASSIGNOR TO SPLITDORF ELECTRICAL COMPANY, OF NEWARK, NEW JERSEY.

GOVERNOR FOR ELECTRICAL CIRCUITS.

1,415,495.

Specification of Letters Patent.  Patented May 9, 1922.

Application filed April 7, 1919. Serial No. 288,385.

*To all whom it may concern:*

Be it known that I, EDWARD J. TOMLINSON, a citizen of the United States, residing at East Orange, in the county of Essex and State of New Jersey, have invented certain new and useful Improvements in a Governor for Electrical Circuits, of which the following is a specification.

This invention relates to a governor particularly adapted for use in governing an electrical circuit and by way of application I have, in the following specification, shown its use in connection with a phonograph motor which is an instrument that requires a very steady speed. While maintaining a steady speed the governor should be capable of adjustment so that for any given record the speed may be changed to suit circumstances. It is, therefore, the object of my invention to provide a governor which will control the speed of such an electrical motor to a high degree of nicety at the same time providing a governor that is very simple in its construction, cheap to manufacture and capable of easy adjustment for setting the speed of the motor to suit any predetermined condition.

Other and further objects will be apparent to one skilled in this art after a study of the specification and annexed drawing, wherein—

Figure 4 is a part sectional and elevation of a modified form of governor, while

The governor shown in this application is also shown and partly described in my copending application, Serial No. 288,386, filed April 7, 1919, and the parts of the phonograph motor herein shown will only be referred to briefly as the motor per se is fully described and claimed in the above mentioned application and therefore constitutes no part of the subject matter of the governor claimed in this application.

Figure 2:
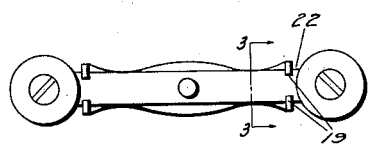
Figure 2 is a plan view of a portion of the governor mechanism.
Figure 3:
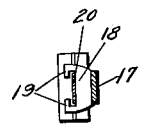
Figure 3 is a section on the line 3—3 of Figure 2.
Figure 1:
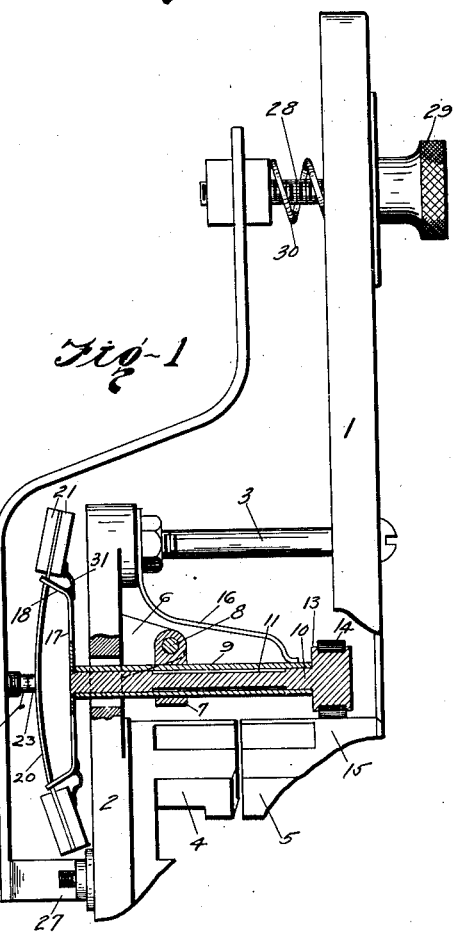
Figure 1 is a part sectional elevation of a phonograph motor with a part of the governor mechanism shown in section.

Referring now to the details, wherein like numbers refer to corresponding parts in the various views, 1 is the frame of a phonograph motor to which is attached a base member 2 by any suitable means, such as studs 3, one of which is shown in Figure 1. The base member 2 carries, preferably integral therewith, a series of pole pieces 4 which are adapted to cooperate with armature bodies or pole pieces 5 carried on a rotatable part of the motor. Attached to the base 2 is a lug 6 carrying a pivotal bracket 7, in any suitable manner, such as by a pivot pin 8. The bracket 7 carries a sleeve 9 within which a shaft 10 is journalled. The shaft 10 is preferably recessed as at 11 for carrying lubricant therein. This lubricant may be inserted in any manner, such as by hole 12, shown in Figure 4. The lubricant may be carried in a suitable retainer such as a piece of felt placed in the recess 11. The end of the shaft 10 carries a hub 13 to which is fastened a tire 14 of suitable friction material that is adapted to run on the periphery 15 of the rotating member. The tire 14 is kept in continual and sufficient engagement with the periphery 15 of the rotating member by any suitable means such as a spring 16 which presses against the bearing sleeve 9 as shown in Figure 1. The other end of the shaft 10 carries a member 17 which has its ends preferably turned up at 18 and the ends bent inward toward each other, forming fingers 19, thereby forming two slots within which rests a resilient member 20. As will be seen from Figure 3, there is sufficient clearance in the slots formed by the fingers 19 to allow the member 20 to slide laterally therein in a direction parallel with the member 17. The amount of lateral movement however is limited by weights 21 which are fastened to the resilient member 20. This clearance is more clearly indicated at 22, in Figure 2. The member 20 is preferably bowed outward away from the member 17 and carries preferably at its center a contact 23. Adapted to cooperate with the contact 23 is a contact 24 carried on an adjustable screw 25 which in turn is mounted on an arm 26. One end of the arm 26 is fastened to the base member 2 by bracket 27, being insulated therefrom for purposes of the electrical circuit which will be seen by referring to Figure 5. The other end of the arm 26 is carried on a screw stud 28 which stud, by means of a knurled thumb nut 29, can be turned so as to move the end of the arm 26 toward and from the plate 1 thereby moving slightly the position of the contact 24 with relation to the contact 23. Spring 30 is used to hold the end of the arm 26 in any adjusted position. Since the electrical circuit is completed through the resilient member 20 and this is loosely carried on the member 17, in the manner explained, the electrical contact between the members 20 and 17 would be rather poor, therefore, to overcome this objection, I provide stranded flexible conductors 31 each having one end attached to one of the weights 21 and the other end to the member 17. This connection, however is so made that it does not interfere with the operation of the centrifugal weight members.

Figure 5:
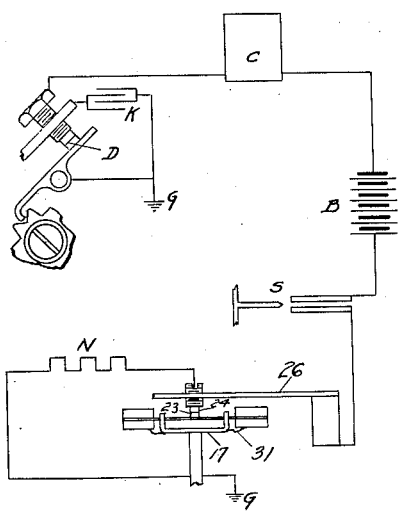
Figure 5 is a diagrammatic arrangement of an electrical circuit used for controlling a phonograph motor showing the governor connected in such a circuit.

In operation, as the driving shaft 10 is rotated by the rotating member of the motor the tendency for the weights 21 is to move outwardly away from member 17 thereby tending to straighten the member 20 and move the contact 23 away from the contact 24 thereby opening the electrical circuit which is shown in Figure 5, from the battery B through the operating coil C, circuit breaker D to the frame of the machine, which is indicated by ground G, through the member 17, conductors 31, through the contacts 23 and 24 to the arm 26, switch S, back to the battery B or other source of current. A non-inductive resistance N is preferably used across the contacts 23 and 24 and a condenser K across the breaker D. As the governor contacts 23 and 24 open the current is removed from the operating coil of the motor and no impulse is applied to it during the interval that the governor contacts are open, however the instant the speed starts to drop the contacts close and the operation is continued. The parts of my governor are so constructed that it is very sensitive and responds to minute changes of speed in the rotating member.

From what has been said, it will be seen that as the governor operates the contact 23 moves away from the contact 24 in a direction substantially parallel with the driving shaft 10 and due to the ability of the member 20 to move to the right or left and also due to the continual rotary motion when the governor is in operation, the contacts 23 and 24 are rubbed together very gently so that the difficulty of a bad contact is obviated.

Figure 4:
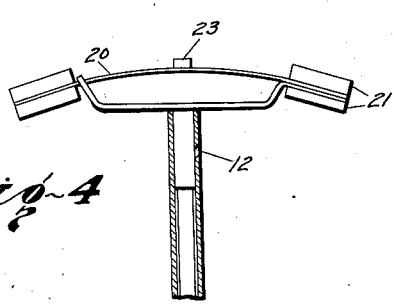

As shown in Figure 4, one set of the governor weights 21 may be fastened rigidly to one end of the members 17 and 20 leaving only the other end of member 20 free to move in the slot formed by the fingers 10, however, this is only one of numerous changes which may be made in the details without departing from the spirit of my invention or the scope of the appended claims.

Having thus described my invention what I claim is:—

1. In a governor for an electrical circuit, the combination of a bearing support carrying a rotatable shaft, a member supported on the end of said shaft and extending at right angles thereto and having its ends upturned, a flexible member supported on said upturned end and having weights fastened to the ends thereof, a contact carried by said flexible member and a member carrying a contact to cooperate with the first contact for the purpose described.

2. In a governor for an electrical circuit, the combination of a bearing support carrying a rotatable shaft, a member supported on the end of said shaft and extending at right angles thereto and having its ends upturned, fingers on said upturned ends extending toward each other forming slots, a flexible member supported on said upturned ends within said slots and having weights fastened to the ends thereof closely adjacent said fingers, a contact carried by said flexible member and an adjustable arm carrying a contact to cooperate with the first contact as described.

3. In a governor for an electrical circuit, the combination of a bearing support carrying a rotatable shaft, a member supported on the end of said shaft and extending at right angles thereto and having its ends upturned, fingers on said upturned ends extending toward each other forming slots, a flexible member loosely supported on said ends within said slots and having weights fastened to the ends thereof closely adjacent said fingers thereby permitting a small longitudinal movement of the flexible member, a contact carried by said flexible member and an adjustable contact to cooperate with said first contact for the purpose described.

4. In a governor for an electrical circuit, the combination of a movable bearing support, a shaft carried by said support and having a drive member on one end and a laterally extending member having upturned ends on the other end, a flexible member carried on said ends in such a manner as to have a small amount of horizontal movement with respect to the laterally extended member, said flexible member being normally bowed outwardly from the laterally extended member and having weighted ends and carrying a centrally located contact and a cooperating contact carried on an adjustable member.

5. In a governor for an electrical circuit, the combination of a pivotally mounted bearing support, a shaft carried by said support and having a drive member on one end and a laterally extending member on the other end, a contact carried on a flexible member having weighted ends and supported on said laterally extending member in such a manner that when said member is rotated said flexible member is moved so as to move the contact in a direction parallel to the axis of rotation of said shaft, and a stationary contact to cooperate with the first contact as and for the purpose described.

6. In a governor for an electrical circuit, the combination of an adjustable bearing support, a shaft carried by said support and having a drive member on one end and a laterally extending member on the other end, an outwardly curved flexible member supported on the ends of said laterally extending member in such a manner that one end at least is free to slide on its support, means responsive to centrifugal force attached to ends of said flexible member for causing said member to straighten out, a pair of contacts one relatively stationary and the other carried on said flexible member whereby when said member is rotated a wiping action at the contacts is obtained and when said flexible member is straightened its contact is moved away from the stationary contact in a manner such that their contact surfaces remain substantially parallel.

7. In a governor for an electrical circuit, a pair of contacts for opening and closing the circuit, one of said contacts being stationary and adjustable with respect to the second, said second contact being carried on a flexible member, a member for supporting the flexible member in such a manner that one end at least is free to move longitudinally with respect to said support member, means responsive to centrifugal force for flexing said flexible member to open and close said contacts and driving means for rotating said support and flexible member.

8. In a governor for an electrical circuit, a pair of contacts for opening and closing the circuit, one of said contacts being stationary and adjustable with respect to the second, said second contact being carried on a flexible member, a member for supporting the flexible member in such a manner that one end at least is free to move longitudinally with respect to said support member, means responsive to centrifugal force for flexing said flexible member to open and close said contacts, flexible electrical conductors for connecting the flexible member, carrying the second contact, to the support member and driving means for rotating said support and flexible member.

In witness whereof, I affix my signature.

EDWARD J. TOMLINSON.